Figure 1:
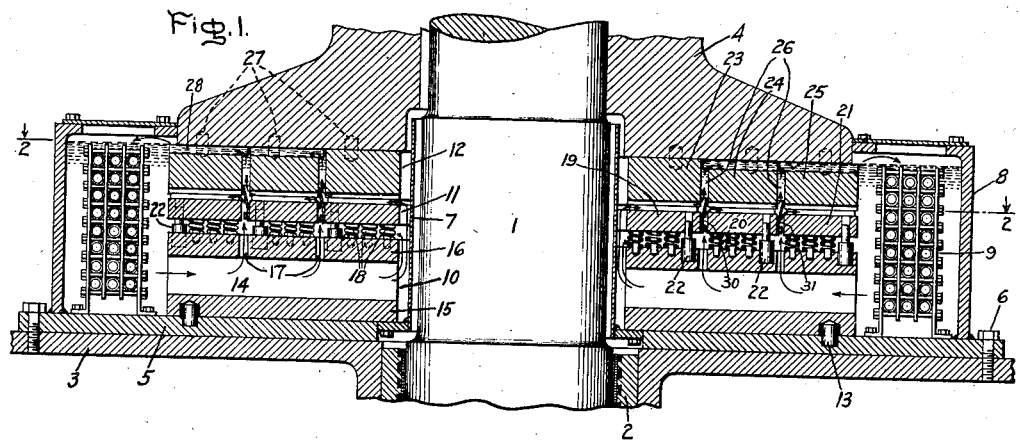

Sept. 29, 1931.  T. W. GORDON  1,825,519

THRUST BEARING

Filed June 7, 1930

Inventor:
Theodore W Gordon,
by Charles E. Tullar
His Attorney.

Patented Sept. 29, 1931

1,825,510

UNITED STATES PATENT OFFICE

THEODORE W. GORDON, OF SCHENECTADY, NEW YORK, ASSIGNOR TO GENERAL ELECTRIC COMPANY, A CORPORATION OF NEW YORK

THRUST BEARING

Application filed June 7, 1930. Serial No. 459,805.

The present invention relates to machine bearings and more especially to bearings of the thrust type whereby heavy rotating parts are supported to turn about a vertical axis.

The advances in the present-day electric-generator art have made necessary the provision of thrust bearings individually capable of carrying loads upwards of a million pounds and rotating at high speeds.

The object of my invention is the provision of an improved heavy duty thrust bearing of simple construction and low cost of manufacture which shall automatically circulate the lubricating oil so that it and all parts of the rubbing bearing surfaces shall function with high efficiency and without danger of becoming deteriorated in use.

It is generally recognized that lubrication of bearings consists in maintaining a fluid film of lubricating oil between the opposed rubbing surfaces so that they may not make metallic contact with each other at any point, also that it is the viscosity of the lubricating oil that enables it to maintain itself in such a fluid film. Although the lubricating oil may keep the rubbing metal surfaces out of frictional contact, it is impossible to avoid the development of friction in a bearing since the movement under pressure between the molecules of the oil film produces friction.

Where the bearing surfaces operate under heavy duty and at high speeds, the heat generated therein by friction operates to lessen or destroy the viscosity of the oil and to effect chemical changes therein according to the time it is subjected to heat.

In order to prevent accumulation of heat in a bearing, it must be dissipated as generated either by conduction through the metal of the bearing or by discharge of the oil films before they become much heated, and in high speed machines the amount of heat that can be dissipated by conduction through the metal parts is relatively slight and accordingly free and early discharge of oil films must be depended upon to carry off the greater part of the heat generated.

It is impractical to make the load-carrying areas of the rubbing surfaces of a bearing sufficiently small to provide for the necessary early discharge of the oil films, since it is essential that such load-carrying areas be sufficiently large to enable the oil drawn in between them in the relative rotation of the bearing members to build up pressure films sufficient to support the great weight carried by the bearing.

I have found, however, that by making the load-carrying areas as small as permissible under the pressure film requirements and delivering a full supply of fresh oil at low temperature to each of those areas, that fluid films of the requisite value can be built up and discharged before the viscosity of the oil has become seriously lessened by the heat generated therein and the present invention is a practical apparatus embodying these principles.

Figure 2:
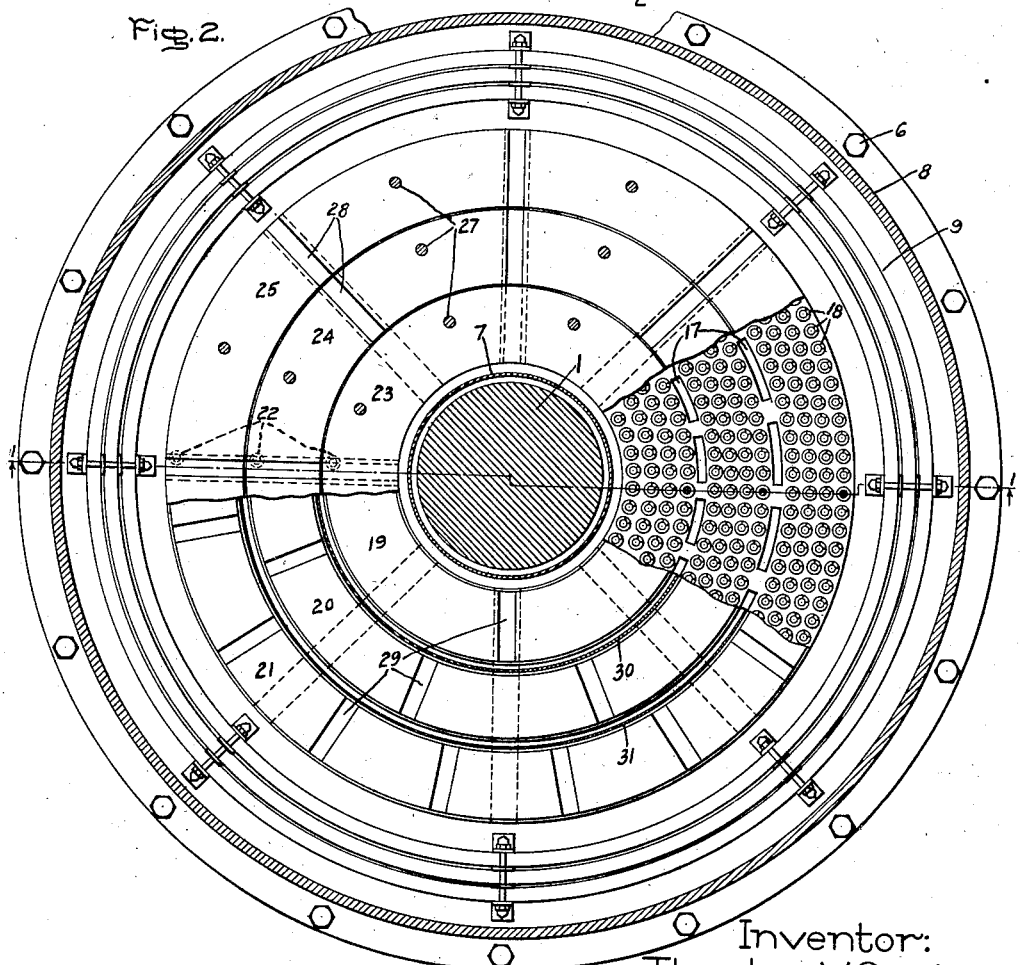

For a better understanding of my invention, reference may be made to the accompanying drawings showing one embodiment thereof in which Fig. 1 is a vertical section of a thrust bearing taken on line 1—1 of Fig. 2, and Fig. 2 is a top plan thereof with certain parts removed or broken away.

As shown in the drawings, the bearing is employed in connection with a hydroelectric generator of the vertical type with its shaft 1 held centered by an ordinary guide bearing 2 secured to the upper frame or casing 3 of the generator. The shaft 1 has fixedly secured thereto a radial flange 4 and the thrust bearing is interposed between the lower side thereof and the upper frame 3 to rotatably support the weight of the shaft 1 and the rotatable parts of the generator carried thereby (not shown).

The bearing operates in a bath of oil contained in a reservoir made up of a circular bottom slab 5 with a central opening and designed to rest upon the top of the generator casing about the shaft 1, and held in place by bolts 6. At the inner and outer peripheries of the slab 5 cylindrical walls 7 and 8 are welded at their lower ends and adjacent the outer wall 8 of the oil well is an annular stack of radiator pipes 9 through which cooling water or other fluid is adapted to be circulated.

The bearing comprises a rigid base ring 10, a yieldingly supported rubbing member 11 and a runner member 12 secured to the shaft flange 4.

The base ring 10 is a rigid casting resting upon the bottom of the annular oil well and held in position by dowels 13. It is cored out in radial sectors to provide oil passages 14 between its top and bottom walls 15 and 16 and vertical oil passages 17 extend in circular arrangement through the top wall 16.

The yieldingly supported rubbing member 11 is a flexible disk with its rubbing upper surface babbitted and resting at its lower surface upon a bed of helical springs 18 mounted on the top of the base ring 10. The flexible disk may be in a single piece with circularly arranged oil passages similar to the passages 17 of the base ring or it may be composed of a plurality of concentric rings 19, 20 and 21 with oil spaces between them and each held in operative position by loose dowels 22 set in the top of the base ring.

The runner member 12, as shown, consists of a plurality of concentric rings 23, 24 and 25 with annular oil spaces 26 between them and each secured to the underside of the shaft flange 4 by dowels 27. The intermediate and outer rings are provided in their upper sides with a plurality of radial oil passages 28.

The rubbing surfaces of the bearing are provided with cross oil grooves 29 which divide them into load-carrying areas on which the fluid films are built up as the oil is dragged in from the grooves 29 in the relative rotation of the two rubbing surfaces. In order that the circular travel of the oil in a film, especially at the inner edges, may be sufficiently lengthy to build up the necessary pressure to prevent the opposed rubbing surfaces coming into metallic contact at any point, I divide the rubbing surfaces of the rings 19, 20 and 21 somewhat according to lengths of their diameters. As shown, the innermost has four radial oil grooves 29, the intermediate ring has eight and the other ring has sixteen.

As above set forth, the oil of a film as it escapes from between the pressure-carrying areas is in a moderately heated condition and its viscosity correspondingly impaired and in order to insure that it be cooled and restored to its full lubricating value before it again enters between pressure-carrying areas, I provide annular deflecting dams 30 and 31 respectively attached to the outer peripheries of the bearing rings 19 and 20 which extend upwardly between the bearing rings 23, 24 and 25 where they lightly bear upon the inner peripheries of rings 24 and 25 while the inner peripheries of bearing rings 20 and 21 are spaced from the outer surfaces of the dams 30 and 31 to permit flow of fresh oil outside thereof to the outer rubbing surfaces.

In operation of the bearing rotary movement of the runner member 12, by means of the centrifugal pumping action produced thereby, causes a circulation of the oil radially outward from the peripheries and oil grooves of the rubbing surfaces. The oil discharged from between ring 23 and ring 19 is deflected by the dam 30 upwardly and is thrown out through the radial oil passages 28 in the other rings 24 and 25. The oil discharged from between ring 24 and ring 20 is likewise deflected by dam 31 and thrown out through the oil passages in ring 25.

The oil is normally maintained in the oil well at substantially the level of the top of the radiator coil 9 and the oil as centrifugally discharged from the bearing flows over and through the coil 9 where it gives up its heat and thereafter flows back through the various passages to eventually be drawn into lubricating films between the respective sets of mating rings and rings as indicated by the circulating arrows of Fig. 1.

It is evident that my invention makes it practicable to build continuous ring bearings with substantially unlimited rubbing areas without liability of heating unduly the lubricating oil films at any point thereof, while at the same time every point of the rubbing areas operate effectively to bear its share of the load.

What I claim as new and desire to secure by Letters Patent of the United States, is:

1. In a bearing, a plurality of concentrical ring cooperating members radially spaced, and means interposed between said cooperating members for deflecting radial flowing lubricant leaving the bearing surfaces of one set of cooperating members away from bearing surfaces of outer sets of cooperating rings.

2. In a bearing comprising bearing surfaces defining a plurality of annular concentrical cooperating rings, means interposed intermediate said rings for deflecting radial flowing lubricant away from the bearing surfaces of outer cooperating rings, and means for conducting said deflected lubricant out of said bearing.

3. A bearing comprising a member rotating with a shaft and provided with concentrical bearing surfaces, a stationary member provided with concentrical bearing surfaces in contact with said rotating concentrical bearing surfaces and receiving pressure therefrom, annular lubricant deflecting members interposed between said stationary concentrical bearing surfaces and extending between said rotating surfaces and said rotating member being provided with apertures for centrifugally discharging the deflected lubricant.

4. In a bearing comprising cooperating concentrical ring members radially spaced, said concentrical ring members having oil grooves across the faces thereof, the spacing of said grooves decreasing as the distance from the axis increases, means for deflecting radial flowing lubricant discharged from a pair of cooperating bearing surfaces and means for conducting said discharged lubricant from said bearing.

5. In a thrust bearing having its bearing surfaces in the form of spaced concentrical rings, means intermediate the concentrical cooperating bearing surfaces for deflecting radially flowing lubricant leaving one set of cooperating bearing surfaces, means for carrying said deflected lubricant away from said bearing, and means for supplying cool lubricant to the lubricant inlet side of said cooperating bearing surfaces.

In witness whereof, I have hereunto set my hand this 6th day of June, 1930.

THEODORE W. GORDON.